United States Patent
Cereda et al.

(10) Patent No.: US 10,211,639 B2
(45) Date of Patent: Feb. 19, 2019

(54) PADMOUNT TRANSFORMER WITH ENERGY STORAGE APPARATUS

(71) Applicant: ABB Schweiz AG, Zurich (CH)

(72) Inventors: Carlo Cereda, Caravaggio (IT); Deia Bayoumi, Cary, NC (US)

(73) Assignee: ABB Schweiz AG, Baden (CH)

( * ) Notice: Subject to any disclaimer, the term of this patent is extended or adjusted under 35 U.S.C. 154(b) by 106 days.

(21) Appl. No.: 15/160,315

(22) Filed: May 20, 2016

(65) Prior Publication Data

US 2017/0338658 A1 Nov. 23, 2017

(51) Int. Cl.
| H02J 3/38 | (2006.01) |
| H01F 27/02 | (2006.01) |
| H01F 27/06 | (2006.01) |

(52) U.S. Cl.
CPC .............. *H02J 3/383* (2013.01); *H01F 27/02* (2013.01); *H01F 27/06* (2013.01); *H02J 3/386* (2013.01); *H02J 3/387* (2013.01)

(58) Field of Classification Search
CPC .......... H02J 3/386; H02J 3/387; H01F 27/06; H01F 27/29; H01F 27/02; H02M 7/44
See application file for complete search history.

(56) References Cited

U.S. PATENT DOCUMENTS

| 2009/0152947 A1* | 6/2009 | Wang | H02J 1/14 307/24 |
| 2011/0082598 A1* | 4/2011 | Boretto | G06Q 10/06 700/291 |
| 2012/0197449 A1* | 8/2012 | Sanders | G05B 15/02 700/291 |
| 2013/0169046 A1* | 7/2013 | Shin | H02J 9/062 307/23 |
| 2014/0090865 A1* | 4/2014 | Potucek | H05K 5/061 174/50.51 |
| 2015/0153153 A1* | 6/2015 | Premm | H02J 3/00 700/298 |
| 2017/0005515 A1* | 1/2017 | Sanders | H02J 3/381 |
| 2017/0012429 A1* | 1/2017 | Nanda | H02J 3/382 |
| 2017/0250542 A1* | 8/2017 | Panosyan | H02J 4/00 |
| 2017/0262007 A1* | 9/2017 | Zhiwu | G05B 11/01 |

\* cited by examiner

*Primary Examiner* — Alfonso Perez Borroto
*Assistant Examiner* — Esayas Yeshaw
(74) *Attorney, Agent, or Firm* — J. Bruce Schelkopf; Taft Stettinius & Hollister LLP

(57) ABSTRACT

The present disclosure is directed to a padmount transformer. The padmount transformer includes an electrical distribution transformer housed in a cabinet that can be mounted on a ground level platform or pad. High/medium voltage connectors of the electrical distribution transformer can connect to high/medium voltage terminals of a power supply network. Low voltage connectors of the electrical distribution transformer are configured to connect to low voltage terminals of one or more loads coupled to respective renewable energy sources. The high/medium voltage connectors and the low voltage connectors are housed in the cabinet. An energy storage apparatus is housed in the cabinet and is connected with the low voltage connectors for supplying power to the loads. Power can be supplied to the energy storage apparatus by the renewable energy sources. An inverter is operable for commanding the power supply direction at the energy storage apparatus and a control unit is configured to control the inverter.

19 Claims, 2 Drawing Sheets

PADMOUNT TRANSFORMER WITH ENERGY STORAGE APPARATUS

BACKGROUND

Technical Field

The present disclosure relates to a transformer, in particular to a padmount transformer, i.e. a ground mounted electric power distribution transformer housed in a locked cabinet to be mounted on a ground level platform or a concrete pad. The transformer according to the present disclosure is provided with an energy storage apparatus and is to be integrated in a system where at least some customers/loads supplied by the transformer are provided with renewable energy sources. The transformer according to the present disclosure is particularly suitable to handle the situation in which some customers/loads are subjected to black-outs and require technical solutions to manage the black-out conditions.

Description of the Related Art

Padmount transformers are used with underground electric power distribution lines at service drops and convert the power distribution network high or medium voltage to a low voltage supplied to loads, such as buildings, industries or the like. A single padmount transformer may serve one or more customers/loads.

Known padmount transformers include a transformer cabinet, usually housing a tank for holding the core/coil assembly of the transformer immersed in oil, and a wiring cabinet having compartments for enclosing the high/medium and low voltage bushings as well as medium voltage and low voltage connections and equipments.

Recently, the integration of renewable energy sources in electrical power systems are steadily increasing. In particular, it has become common to apply renewable energy sources, such as solar cells or wind generators, to the buildings which however maintains the connections with the power distribution network.

The renewable energy production tends to be variable and unpredictable. For example, considering the solar cells, there is an excess of power and energy generated during sunny hours of the day, which frequently do not correspond to the peaks of power demand by the loads. Under these circumstances, there is reverse flow of power in the power distribution network, (i.e. the renewable energy produced is supplied to the network), which should be reused when the production becomes lower than the load consumption. From an energetic point of view, this is not convenient because it causes power losses in the power distribution network since the energy has to be sent kilometres away to be used and the voltage at transformers side might increase and become too high to be acceptable for the electrical equipment forcing the electrical distributor in making important investments to manage the problem.

In order to deal with this issue, several solutions have been proposed.

A first proposed solution is that areas having a high concentration of renewable energy sources directly supply energy to areas having a lower concentration of/no renewable energy sources. This solution, however, is not fully satisfactory because it does not solve the problem of the shift between the peak of production and the peak of demand. Moreover, the energy produced by one are may be not sufficient for the area itself and the additional areas.

Another proposed solution is to provide the electric power distribution lines with energy storage systems. To this purpose, for example, it has been proposed to accumulate water through water pumping in some high altitude natural or artificial basins during the renewable energy peaks of production and then to withdraw the hydraulic energy during peaks of power demands. This solution however implies high investments in the network and does not solve the problem of power losses in the network since water basins can be extremely far away from the location where the energy is first produced.

Another proposed solution is to integrate each renewable power source with batteries able to accumulate small portions of produced energy. This solution however has the problem of a low effectiveness, leaves the problem to the discretion of the single user and is not satisfactory on a larger scale, for example in a city district where some users have renewable power sources with batteries and some other users have power sources with no batteries.

Finally, with reference to the problem of customers/loads particularly sensitives to black-outs, tailor-made solutions have been proposed, like installing an uninterruptable power supply (UPS) in every location needing a continuous flow of electrical energy supply even in presence of a black-out. However, this solution is expensive and requires a regular maintenance of UPS that a normal user might be not able to provide. Hence, there is desire and room for further improvements.

BRIEF SUMMARY OF THE INVENTION

The present disclosure is aimed at meeting at least partially this desires and provides a system allowing an integration of the standard power distribution network with the increasing level of renewable energy sources in an efficient and cost-effective manner.

In particular, the present disclosure provides a padmount transformer comprising:
  a cabinet;
  an electrical distribution transformer housed in the cabinet to be mounted on a ground level platform or pad;
  high/medium voltage connectors for the connection of the electrical distribution transformer to high/medium voltage terminals of a power supply network, and low voltage connectors for the connection of the electrical distribution transformer to low voltage terminals of one or more loads coupled to respective renewable energy sources, the high/medium voltage connectors and the low voltage connectors being housed in the cabinet;
  an energy storage apparatus housed in the cabinet and connected with the low voltage connectors for supplying power to the loads and for being power supplied by the renewable energy sources coupled thereto;
  an inverter for commanding the power supply direction at the energy storage apparatus, said inverter being housed in the cabinet; and
  a control unit for controlling the inverter.

The padmount transformer according to the present disclosure is capable of absorbing the energy generated by the renewable sources during peaks of production, for example during sunny and/or windy hours of the day, and consequently limits reverse flow of power in the distribution network.

Moreover, the padmount transformer according to the present disclosure is efficient because it allows to store the excess of energy close to where it is generated and then to give it back when needed, thereby saving most of power losses.

Further, the padmount transformer according to the present disclosure is able to regulate the voltage so to allow an integration of bigger renewable power in the network without requiring big investment in the distribution network to make the system more powerful.

Additionally, the padmount transformer according to the present disclosure is able to provide electrical energy to sensitive customers/loads guaranteeing a continuous flow of electrical energy in case of necessity, for example in case of blackouts.

Dependent claims define possible exemplary embodiments of the present disclosure.

BRIEF DESCRIPTION OF THE DRAWINGS

Further characteristics and advantages will be more evident from the following description of exemplary embodiments given as a way of an illustration with reference to the enclosed drawings in which.

DETAILED DESCRIPTION

Figure 1:
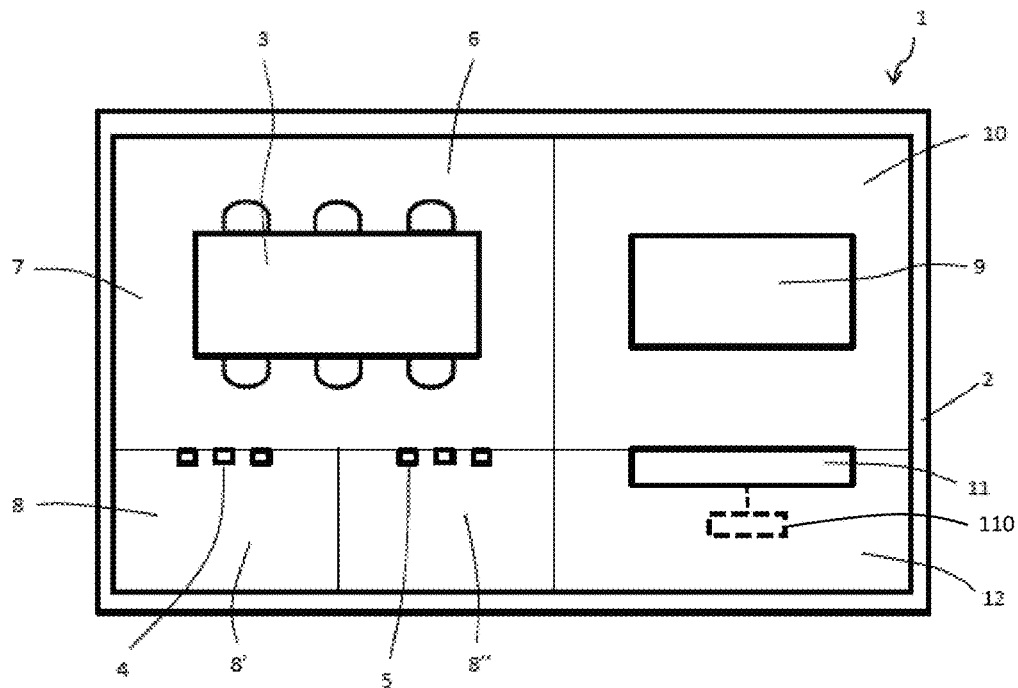
FIG. 1 is schematic plan view of a padmount transformer according to the present disclosure.

In the following description, same alphanumeric references are used for analogous exemplary elements when they are depicted in different drawings.

With reference to the attached Figures, a padmount transformer according to the present disclosure is indicated with reference number 1. The padmount transformer 1 can be used for example for supplying low voltage energy to a city district, to a commercial building for its own supply, to small industries, et cetera. The padmount transformer 1 is mainly intended to be installed outdoor.

The padmount transformer comprises a cabinet 2 configured to house a single-phase or three-phase electrical distribution transformer 3 to be mounted on a ground level platform or pad. Such a distribution transformer 3 is used to step down voltage from a high/medium voltage terminal of an underground electrical distribution system to a low voltage terminal thereof, and includes a core/coil assembly, and electrical connectors, in particular high/medium voltage connectors 4 (for the connection with the network) and low voltage connectors 5 (for the connection with loads), to allow electrical connection between the core/coil assembly, and the high/medium and low voltage terminals.

The distribution transformer 3 is housed in a transformer compartment 6 of the cabinet 2. Preferably, the transformer compartment 6 comprises a transformer tank 7 for holding a quantity of oil or the like where the distribution transformer is immersed. According to an alternative embodiment, the distribution transformer 3 is of the dry-type, so oil is not present.

The electrical connectors 4 and 5 are preferably housed in a connector compartment 8 which is distinct and separated from the transformer compartment 6. The connector compartment 8 is preferably situated in a front position of the cabinet 2 and is accessible for example through a lockable door (not shown). The connector compartment 8 in turn can comprise a high/medium voltage connector compartment 8' and a low voltage connector compartment 8".

The padmount transformer 1 comprises an energy storage apparatus 9, such as a battery pack (for example of the Lithium-Ion, or NaS, or NiCd, or Lead acid type) or a supercapacitor or a fuel cell, which is preferably housed in an energy storage compartment 10 of the cabinet 2. The main purpose of the energy storage apparatus 9 is to store energy coming from the renewable sources associated to the loads and to withdraw stored energy to the loads when necessary, as will be describe in more detail in the following.

The padmount transformer 1 further comprises an inverter 11 controlled for managing charging and discharging of the energy storage apparatus 9 depending on the circumstances. In particular, the inverter 11 determines the energy flow direction from/to the energy storage apparatus 9. The inverter 11 is connected to a control unit (schematically indicated in FIG. 1 by the reference number 110) which controls the inverter 11. The inverter 11 is preferably housed in a further separate inverter compartment 12 of the cabinet 2.

According to a possible embodiment, the energy storage apparatus 9 is also connected to the distribution transformer 3, which to this purpose preferably has two separate secondary windings: one to supply the loads, the other to connect the inverter 11 and the energy storage apparatus 9. In accordance with a possible embodiment, the inverter is connected with a third secondary winding.

It is to be noted that the inverter compartment 12 and the energy storage compartment 10 are preferably located laterally with respect to the transformer compartment 6. In accordance with a further embodiment not shown, the inverter compartment 12 and the energy storage compartment 10 are located above the transformer compartment 6 or behind.

Figure 2:
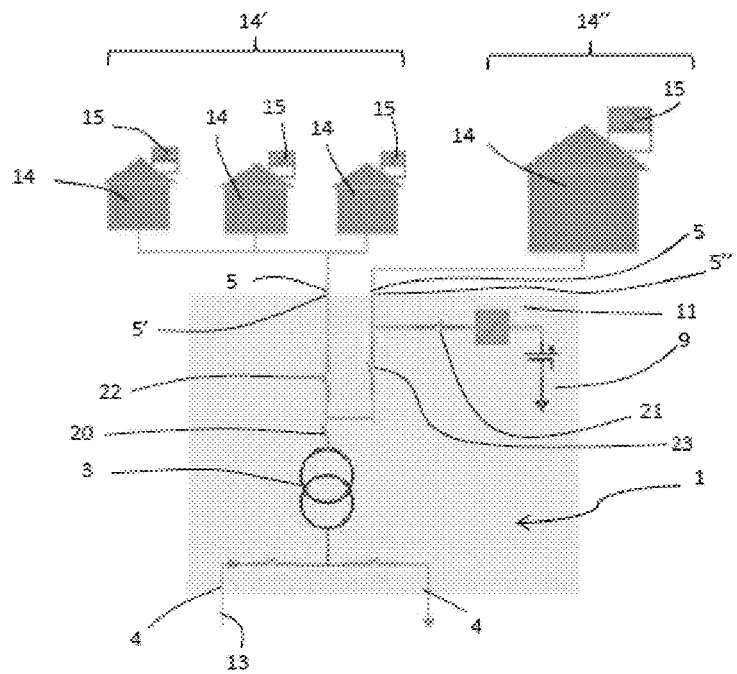
FIG. 2 is schematic view of system including a padmount transformer according to the present disclosure.

With reference to FIG. 2 the functioning of the padmount transformer 1 according to the present disclosure will be described.

In correspondence of the high/medium voltage electrical connectors 4, the padmount transformer 1 is connected to the high/medium voltage network 13. The distribution transformer 3 converts the high/medium voltage of the network 13 into low voltage and vice-versa. The transformed power from the network 13 is then supplied to the loads 14 through the electrical low voltage connectors 5. Each of the depicted loads is provided with a renewable energy source 15 which can in turn produce low voltage energy. This renewable energy is in turn supplied through the electrical low voltage connectors 5 to the energy storage apparatus 9 under the control of the inverter 11, or it can be further supplied to the padmount transformer 3 where it can be converted into medium/high voltage by the distribution transformer 3 and supplied to the network 14 through the electrical high/medium voltage connectors 4.

Figure 3:
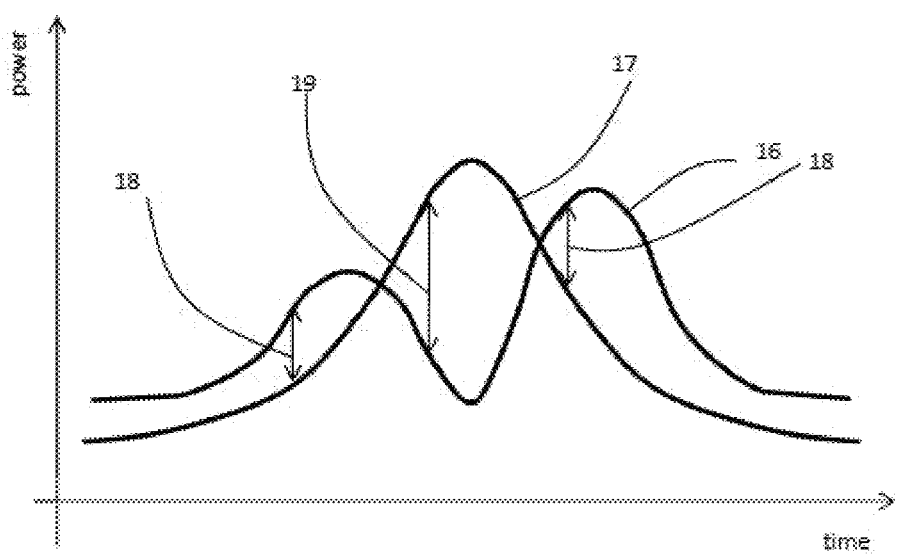
FIG. 3 is an exemplary diagram comparing the renewable power generation by a solar photovoltaic plant with a power demand during a day.

On average, the trend of the loads energy consumption compared to the trend of the renewable energy production in the case the latter is produced by solar cells during a day is the one shown in FIG. 3. The power demand (line 16) in the morning and in the evening is higher than in the afternoon, whilst the energy production (line 17) reaches its peak in the afternoon when the demand is usually low. Therefore, advantageously, the control unit 110 is configured to control the inverter 11 such that the excess power 18 produced by the renewal energy source is stored in the energy storage apparatus 9 when the energy produced is higher than the load consumption. If under the above circumstances the energy storage apparatus 9 is full, i.e. it cannot be charged more under the same conditions, the excess energy that cannot be stored in the energy store apparatus 9 is supplied to the network 13.

When, on the contrary, the renewable energy production is lower than the demand, the portion of energy 19 which is missing can be supplied to the loads by the energy storage apparatus 9. When, under these circumstances, the energy storage apparatus 9 is empty or has reached a minimum predetermined charge status (as will be described later), or if the energy storage apparatus 9 cannot supply all the missing power 19 demanded by the loads, the power that cannot be provided by the energy storage apparatus 9 can be obtained from the network 13 after conversion into low voltage in the distribution transformer 3.

It is to be noted that, in view of what above described, the control unit 110 can control the energy storage apparatus 9 and the inverter 11 such that the energy storage apparatus 9 acts so to help the network 13 in reducing peaks absorption, by charging the energy storage apparatus 9 during low power consumption hours and providing the energy back when the load exceeds a predefined value in power or current. Furthermore, the energy storage apparatus 9 can help the network 13 in levelling the load, by charging during low power consumption hours and providing the energy back when the load exceeds a predefined value in power or current.

In accordance with a possible embodiment, the loads 14 are divided into two groups, namely standard loads 14' and sensitive loads 14", wherein sensitive loads 14" include for example hospitals, data-centres, and the like. Consequently, the electrical low voltage connections are divided in two groups, in particular they comprise standard low voltage connectors 5'—for the connection to standard loads 14'—and sensitive low voltage connectors 5"—for the connection to sensitive loads. Advantageously, the control unit 110 is configured to control the inverter 11 such that a safety energy reserve is always maintained in the energy storage apparatus 9. In this manner, in case of a blackout in the network 13, the energy is supplied from the energy storage apparatus 9 both to standard loads 14' and sensitive loads 14" until the state of charge of the energy storage apparatus 9 drops to a predetermined level corresponding to the safety energy reserve. When however the state of charge of the energy storage apparatus 9 further drops below said level, the energy from the energy storage apparatus 9 is supplied only to the sensitive loads 14".

It is to be noted that switching devices are preferably associated to the standard low voltage connectors 5' and to the sensitive low voltage connectors 5" to allow the control unit to connect and disconnect the standard loads and the sensitive loads.

In accordance with an embodiment, the padmount transformer further comprises a switching device 20 to disconnect the inverter from the transformer in case of black out to guarantee all the generated electrical energy for the batteries goes to the low voltage loads.

In accordance with an embodiment, the padmount transformer comprises a further switching device 21 associated to the inverter so to allow the connection and the disconnection of the inverter from the low voltage network.

Further switching devices 22, 23 can be provided in the low voltage network in order to manage the energy flows between the transformer, the loads and the inverter.

In general, the control unit 110 can be configured to control the inverter such that, under specific circumstances, the energy storage apparatus supplies energy to the power supply network. In the following, some examples are given.

According to a possible embodiment, the control unit is configured to control the inverter 11 such that the energy storage apparatus 9 acts as a voltage support for the power supply network 13, i.e., it absorbs or injects energy in order to keep the grid voltage in a predetermined range of values. This function can be in particular of use in case of weak network, where the load during the day is so strong that the voltage goes below a minimum acceptable value. In this case, energy can be taken from the power network when the load is low and given back to the network when loads reach the maximum.

According to a possible embodiment, the control unit is configured to control the inverter 11 such that the energy storage apparatus 9 acts for improving the power quality of the network 13. In particular, the energy storage apparatus 9 can act for compensating the effects of voltage sags and dips in the distribution network. In addition, other power quality functions can be obtained by the power supplying from the energy storage apparatus 9 to the network 13, such as active filtering (i.e. at least partially eliminating from the current an harmonic content), reducing/eliminating the reactive power, redistributing loads between the three phases (phase balancing).

The padmount transformer according to the present disclosure can replace an existing standard padmount transformer not having an energy storage apparatus keeping unchanged the high/medium voltage and low voltage cables positions and connections. Moreover, upgrading a standard padmount transformer with a new one according to the present disclosure having energy storage features is cost-effective because it requires a little construction around the device to be installed.

The padmount transformer according to the present disclosure is rugged and can be integrated in a city environment without the need of a fence or any additional protections.

The padmount transformer according to the present disclosure is a standard product in the sense that it has predefined characteristics that allows a simple purchasing process as well as an easy installation process.

The padmount transformer according to the present disclosure allows users to become more grid independent so to reduce the overall energy costs.

Finally, as discussed, the padmount transformer according to the present disclosure allows to solve problems of the network in a simple and cheap manner with an integrated apparatus compared with other alternative solutions like tailor-made systems or strengthen of the distribution network.

To the above-mentioned embodiments of the padmount transformer according to the present disclosure, the skilled person, in order to meet specific current needs, can make several additions, modifications, or substitutions of elements with other operatively equivalent elements, without however departing from the scope of the appended claims.

The invention claimed is:

1. A padmount transformer comprising:
a cabinet;
an electrical distribution transformer housed in the cabinet to be mounted on a ground level platform or pad;
high/medium voltage connectors for connecting the electrical distribution transformer to high/medium voltage terminals of a power supply network, and low voltage connectors for connecting the electrical distribution transformer to low voltage terminals of one or more loads coupled to respective renewable energy sources, the high/medium voltage connectors and the low voltage connectors being housed in the cabinet;
an energy storage apparatus housed in the cabinet and connected with the low voltage connectors for supplying power to said one or more loads and for being power supplied by the renewable energy sources coupled thereto;

an inverter for commanding the power supply direction at the energy storage apparatus, said inverter being housed in the cabinet;

a control unit for controlling the inverter.

2. A padmount transformer according to claim 1, wherein the control unit is configured to command the inverter such that when the power produced by the renewal energy sources exceeds the overall loads power demand, the exceeding power is stored in the energy storage apparatus.

3. A padmount transformer according to claim 1, wherein the control unit is configured to command the inverter such that, when the power produced by the renewable energy sources is lower than the overall loads power demand, at least a portion of the power missing at the loads is supplied by the energy storage apparatus.

4. A padmount transformer according to claim 1, comprising standard low voltage connectors for connection to standard loads of said one or more loads and higher priority low voltage connectors for connection to higher priority loads of said one or more loads, wherein the control unit is configured to command the inverter such that a predetermined safety energy reserve is maintained in the energy storage apparatus to be supplied only to the higher priority loads in case of a blackout in the power supply network when the energy reserve in the energy storage apparatus is below said safety energy reserve.

5. A padmount transformer according to claim 4, comprising switching devices associated to the standard low voltage connectors and to the higher priority low voltage connectors.

6. A padmount transformer according to claim 1, comprising a switching device to connect/disconnect the inverter from the low voltage network.

7. A padmount transformer according to claim 1, wherein the energy storage apparatus comprises a battery pack, or a supercapacitor or a fuel cell.

8. A padmount transformer according to claim 1, wherein the energy storage apparatus is connected to the electrical distribution transformer such that the energy storage apparatus can supply power to and be power supplied by the power supply network.

9. A padmount transformer according to claim 8, wherein the distribution transformer comprises a primary winding, a first secondary windings for supplying the loads, and a second secondary winding for supplying the energy storage apparatus.

10. A padmount transformer according to claim 8, wherein the distribution transformer comprises a third secondary winding connected to the inverter.

11. A padmount transformer according to claim 8, wherein the control unit is configured to control the inverter such that the energy storage apparatus absorbs energy from or injects energy to the power supply network in order to keep the grid voltage in a predetermined range of values.

12. A padmount transformer according to claim 8, wherein the control unit is configured to control the inverter such that the energy storage apparatus acts for compensating voltage sags and dips in the power distribution network.

13. A padmount transformer according to claim 8, wherein the control unit is configured to control the inverter such that the energy storage apparatus acts as an active filter for the power distribution network.

14. A padmount transformer according to claim 8, wherein the control unit is configured to control the inverter such that the energy storage apparatus acts for at least partially eliminating reactive power in the power distribution network.

15. A padmount transformer according to claim 8, wherein the control unit is configured to control the inverter such that the energy storage apparatus performs a phase balancing in the power distribution network.

16. A padmount transformer according to claim 1, comprising a switching device to connect/disconnect the inverter from the transformer.

17. A padmount transformer according to claim 1, wherein the electrical distribution transformer is housed in a transformer compartment of the cabinet, the electrical transformer being immersed in a tank of oil.

18. A padmount transformer according to claim 17, wherein the energy storage apparatus is housed in a separate energy storage compartment of the cabinet.

19. A padmount transformer according to claim 18, wherein the inverter is housed in a separate inverter compartment of the cabinet.

* * * * *